United States Patent [19]
Williams et al.

[11] Patent Number: 5,176,180
[45] Date of Patent: Jan. 5, 1993

[54] COMPOSITE TUBULAR MEMBER WITH AXIAL FIBERS ADJACENT THE SIDE WALLS

[75] Inventors: Jerry G. Williams, Ponca City, Okla.; Mark W. Hopkins, Newark, Del.

[73] Assignee: Conoco Inc., Ponca City, Okla.

[21] Appl. No.: 495,010

[22] Filed: Mar. 15, 1990

[51] Int. Cl.⁵ .................................................. F16L 9/00
[52] U.S. Cl. .................................... 138/172; 138/121; 138/174; 138/DIG. 2; 138/132
[58] Field of Search ............... 138/121, 119, 118, 41, 138/115, 172, 174, 108, 103, 130, 144, 148, 153, DIG. 2, 120, 132, 118; 264/108

[56] References Cited

U.S. PATENT DOCUMENTS

| | | | |
|---|---|---|---|
| 1,930,285 | 10/1933 | Robinson | 138/115 |
| 3,110,754 | 11/1963 | Witort et al. | 138/115 |
| 3,554,284 | 1/1971 | Nystrom | 166/250 |
| 3,604,461 | 9/1971 | Matthews | 138/130 X |
| 4,139,025 | 2/1979 | Cärlstrom | 138/153 |
| 4,290,421 | 9/1981 | Siegmund | 138/115 X |
| 4,522,235 | 6/1985 | Kluss et al. | 138/130 |
| 4,530,379 | 7/1985 | Policelli | 138/109 |
| 4,556,340 | 12/1985 | Morton | 405/195 |
| 4,627,472 | 12/1986 | Goettler et al. | 264/108 X |
| 4,728,224 | 3/1988 | Salama et al. | 405/195 |
| 4,867,205 | 9/1989 | Bournazel et al. | 138/130 |

Primary Examiner—Paul T. Sewell
Assistant Examiner—Bethanne C. Cicconi

[57] ABSTRACT

A composite tubular member having an outer cylindrical member containing fibers oriented to resist internal pressure and provide low bending stiffness, and two inner smaller core members located near the neutral axis of the composite tubular members containing fibers oriented to provide high axial stiffness, high tensile strength and low bending stiffness and fibers oriented to resist shear stress, positioned opposite each other and adjacent to the inner walls of the outer cylindrical member.

12 Claims, 3 Drawing Sheets

COMPOSITE TUBULAR MEMBER WITH AXIAL FIBERS ADJACENT THE SIDE WALLS

BACKGROUND OF THE INVENTION

Coiled steel tubing finds a number of uses in oil well operations. For example, it is used in running wireline cable down hole with well tools, such as logging tools and perforating tools. Such tubing is also used in the workover of wells, to deliver various chemicals and perform other functions.

Steel coiled tubing is capable of being spooled because the steel used in the product exhibits high ductility (i.e. the ability to plastically deform without failure). The spooling operation is commonly conducted while the tube is under high internal pressure which introduces combined load effects. Unfortunately, repeated spooling and use causes fatigue damage and the steel coiled tubing can suddenly fracture and fail. The hazards of the operation and the high personal and economic cost of failure in down time in fishing operations forces the product to be retired after relatively few trips into a well. The cross section of steel tubing expands during repeated use, causes reduced wall thickness and results in lower pressure allowables and higher bending strains.

It is desirable to provide a non-steel coil tubing which is capable of being spooled and which does not suffer from the defects of steel tubing.

THE PRIOR ART

U.S. Pat. No. 3,554,284 to Nystrom teaches the use of a logging cable in which two inner layers of fibers are wound at ±18° and two outer layers are wound at ±35°.

U.S. Pat. No. 4,255,820 to Rothermel et al. discloses a prosthetic ligament formed with a densely woven cylindrical core that provides the axial stiffness for the prosthesis.

U.S. Pat. No. 4,530,379 to Policelli teaches a composite fiber tubing with a transition to a metallic connector. The fibers may be graphite, carbon, aramid or glass. These fibers, in one embodiment, are alternatively laid in ±15° orientations to the longitudinal axis. In the FIG. 4 embodiment, "a wider choice of axial angles of filaments in the layers" is permitted. Further, "This embodiment can be employed in a fluid conveyance pipe having bending loads in addition to internal pressure loads and in structural members having bending and axial stiffness requirements". Policelli suggests that the fiber angles can be selected in a range between 5° and 75° as measured from the axis.

U.S. Pat. No. 4,556,340 to Morton discloses the use of an externally mounted strip on a flexible pipe. The strip may be of any material having large axial stiffness in tension and low axial stiffness in compression. The strip provides "brased bending" (or preferred axis of bending).

U.S. Pat. No. 4,728,224 to Salama discloses a composite mooring tendon on interspersed layers of carbon fibers and aramid fibers, the fibers being axial or low angle helical wrap. A layer of 90° wrap fibers can be provided as an external jacket.

THE INVENTION

In accordance with the invention, composite tubing is provided for use in well logging and workover operation in oil wells. The tubing which is preferably spoolable comprises a composite tubular member having an outer cylindrical member containing fibers oriented to resist internal pressure and provide low bending stiffness and two inner smaller members of generally sine wave configuration located near the neutral axis of the composite tubular member positioned at their bases adjacent diametrically opposite inside walls of the outer composite cylindrical member, said inner members containing fibers oriented to provide high axial stiffness, high tensile strength and low bending stiffness and containing fibers oriented to resist shear stress.

DETAILED DESCRIPTION OF THE INVENTION

Composite fibers (graphite, Kevlar ®, fiberglass, boron, etc.) have numerous assets including high strength, high stiffness, light-weight, etc., however, the stress strain response of composite fibers is linear to failure and therefore non ductile. Composite coil tubing must therefore address the strain limitations in another manner, i.e., by providing a design to meet the requirements with a near elastic response. Such a composite design must have high resistance to bending stresses and internal pressure. It must also have high axial stiffness, high tensile strength and be resistant to shear stress. All of these properties are combined in the composite tubular member of the invention to provide a coiled tubing which can be bent to a radius compatible with a reasonable size spool.

Figure 1:
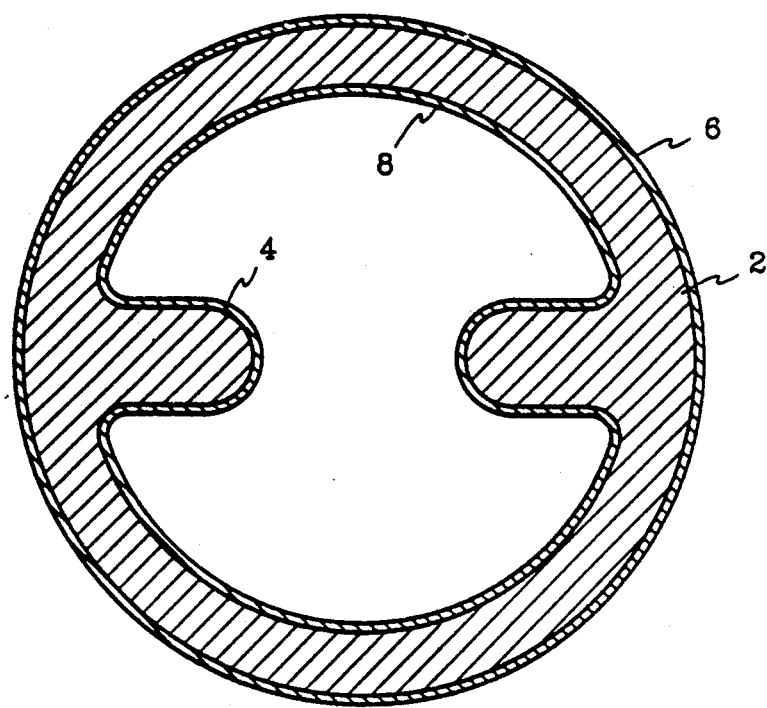
FIG. 1 is a schematic cross-sectional view of a composite tubular member containing oppositely disposed inner members.

The invention is best described by reference to the drawings. FIG. 1 shows a cross-sectional view of a composite tubular member which is made up of a composite cylindrical member 2 and two composite inner members 4. Composite cylindrical member 2 contains fibers which are cross-plied and oriented at ±55° to the axis of the tubular member. The (±) signifies opposite orientation of the fibers at the degrees indicated. This orientation of the fibers is the optimum to achieve high structurally efficiency for outer cylindrical member 2 when such member is subjected to bending and is under internal pressure loading. Outer cylindrical member 2 will usually contain from about 5 to about 10 percent fibers which are oriented at approximately 90°, that is, approximately perpendicular to the axis of the composite tubular member. The inclusion of the 90° fibers lowers the Poisson ratio of the composite tubular member toward 0.5 and increases the ability to carry shear stress in such member.

The opposing inner composite members 4 contain fibers which are oriented at 0° to the axis of the tubular member to meet the requirement for high axial stiffness, high tensile strength and low bending stiffness. Axial loading and thermal expansion may cause cracks in members 4, therefore it is desirable to provide in these members, some fibers which are cross-plied and oriented at ±45° to the axis of the tubular member, to provide resistance to delamination. The 45° oriented material which is resistant to shear loading may be provided either in the form of a uni-directional or woven fabric or braided material and is usually present in inner core members 4 in an amount between about 5 and about 25 percent.

The inner core member 4 form protuberances on the inside of tubular member 2 which are generally shaped like sine curves, as is shown in FIG. 1. To reduce the strain in the 0° oriented material during bending of tubular member 2 it is desirable to have this material close to the axis of the minor moment of inertia of the tubular member cross-section. This is provided by placing inner core members 4 so that the 0° material is concentrated in diametrically opposite sides of the tubular member in the sinusoidol shape shown in which the amplitude of the sine curve configuration is about 0.5 to 3 times the base of such configuration. Good strength in shear and transverse tension of the 0° oriented material in its attachment to outer composite cylindrical member 2 may be obtained by encapsulating the 0° oriented material with ±45° cross-ply material and adhering the ±45° material to the outer composite cylindrical member.

The fibers contained in the outer cylindrical member and the inner core members are held together with a plastic binder such as vinyl ester, epoxy, or a thermoplastic or thermosetting resin.

Economic structural damage tolerance and manufacturing considerations may make it advantageous to use fibers of different materials and different resins for the two components of the composite tubular member. For example, the high stiffness and high strength requirements of the inner core members may best be met by using 0° graphite fibers. On the other hand, lower cost and higher strain to failure of glass fibers may make fiber glass the material of choice for the outer cylindrical member. Other fibers which also may be used are ceramic fibers, polymer fibers, for example, from Kevlar ® polymer which is a product of the Du Pont Company and from Exten ® polymer which is product of The Goodyear Corporation. The plastic binders mentioned, among others may be used in the preparation of the components of the composite tubular member from these materials.

The size of the various components in the composite tubular member will depend on the size of this member. If the composite tubular member is used as coiled tubing, it will usually have a diameter of not more than about 2 inches. The outer composite cylindrical member in a coiled tubing will have a thickness of between about 0.15 and about 0.40 inches. The inner core members of such coiled tubing will have an amplitude of between about 0.25 and about 15.0 inches and a base between about 0.5 and about 5.0 inches.

Referring again to FIG. 1, it may be desirable to line the interior of the composite tubular member with an abrasion and chemically resistant material 8 to provide a pressure type chamber. Materials such as Teflon ®, Kevlar ®, Nylon, Rilsan ® which is sold by ATO Chem, Hytrel ®, sold by Du Pont or Kevlar ® frit may be used for this purpose.

In service, the composite tubular member may buckle and at the points of buckling, impose a normal force on the walls of the casing or open hole. This force will create friction as the tubular member is moved down the hole. The exterior of the composite tubular member may be covered with a protective abrasion resistant cover 6 to resist such wear and friction. Here again, materials such as Kevlar ®, Teflon ®, Nylon, Rilsan ®, Hytrel ® or Kevlar ® frit may be used to form this protective covering.

Figure 2:
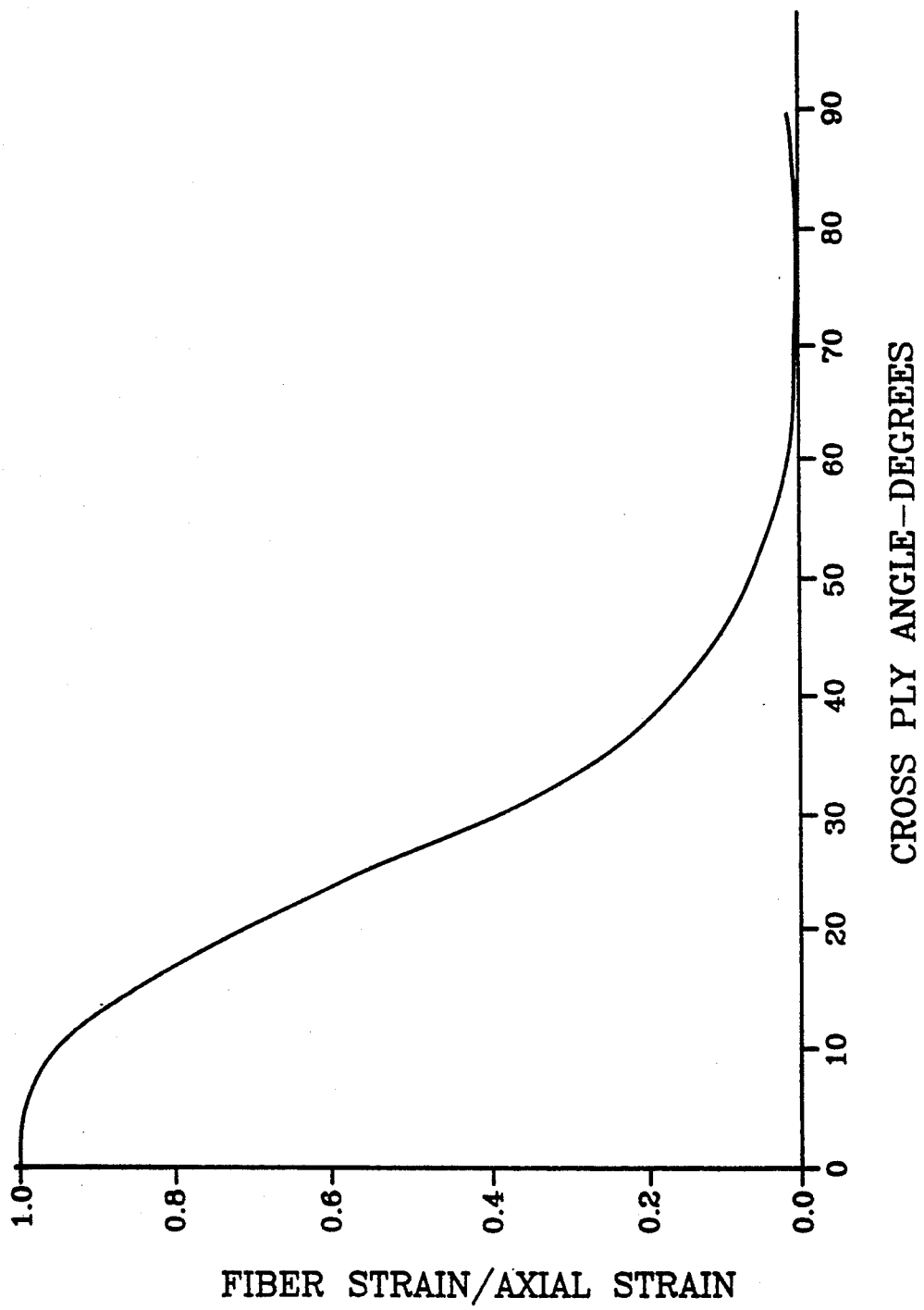
FIG. 2 is a graph showing reductions in the ratio of the strain as a function of increasing the cross-ply angle for a laminate made of high strength graphite fiber.

The axial strain in the cross-plied fiber in the outer cylindrical member of the composite tubular member due to bending is significantly lower than would be similarly placed 0° oriented fibers. Typical reductions in the ratio of fiber strain to the imposed axial strain for a cross-plied laminate presented as a function of the cross-ply angle are presented in the graph of FIG. 2 using representative properties of a high strength graphite fiber. It is noted that for angles greater than approximately ±25° the fiber strain is less than half the axial strain imposed on the laminate and rapidly reduces for larger cross-ply angles. Orienting the fibers in the outer cylindrical member in the manner described herein, optimizes the ability of the composite tubular member to carry the imposed set of loads and minimizes the strain in the fibers due to bending. Minimizing the bending strain in the fibers permits larger diameters for the outer cylindrical member portion of the composite tubular member than would be otherwise possible for a specific spool size. Conversely a given diameter composite tubular member so tailored, can be wound onto a smaller diameter spool. The cylindrical shape of the composite tubular member is also well suited for introducing such member into the well with the belt drive mechanism which is normally used to force the tubular member downhole. The configuration of the composite tubular member of the invention creates a major and minor moment of inertia and forces a preferred direction of bending. In effect, this forces the composite tubular member to wind onto a spool by bending about the minor moment of inertia. Downhole, the buckle pattern will be a mixed mode having one period associated with the minor moment of inertia and a longer, smaller curvature mode associated with the major moment of inertia. The advantage of this configuration is that high stiffness and high strength material can be placed in the composite inner core without significant increase in the associated bending strains or sacrifice in the minimum radius curvature permitted for spooling.

Figure 3:
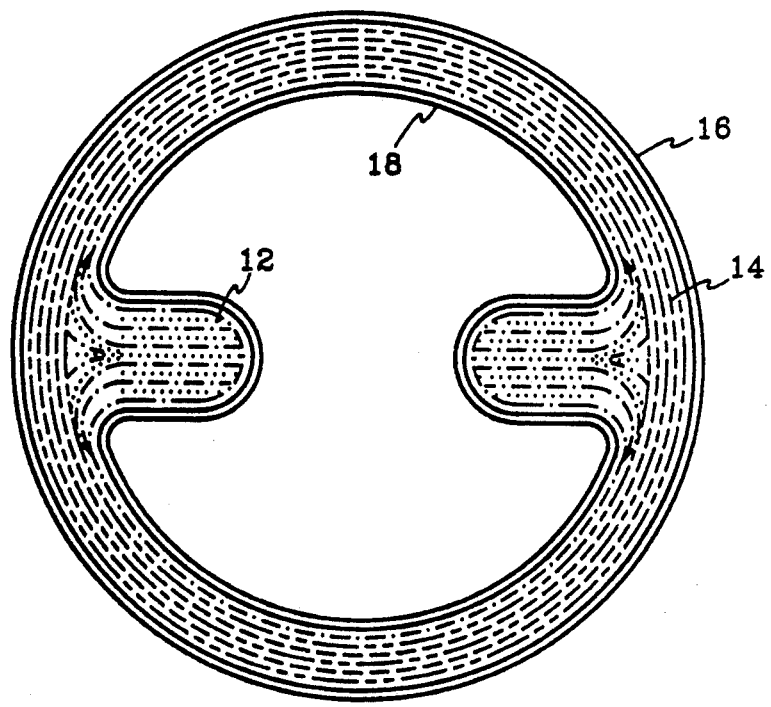
FIG. 3 is a schematic cross-sectional view of a composite tubular member showing the internal arrangement of fibers of differing angularities.

In FIGS. 3, 4, 5 and 6, the broken lines within the bodies of the tubulars indicate the orientation of the fibers in a layer of the tubular. In particular, the dotted lines indicate fibers oriented approximately 0° to the axis of the tubular. Lines formed by alternating dots and dashes indicate fibers oriented approximately ±40° to ±60° to the axis of the tubular. Lines comprised of long dashes separated by two short dashes indicate fibers oriented approximately ±40° to ±70° to the axis of the tubular. Finally, a purely dashed line indicates fibers oriented approximately 90° to the axis of the tubular. FIG. 3 illustrates the internal arrangement of the fibers for a composite tubular member such as that shown in FIG. 1. Referring to FIG. 3, the angularity of the various fibers in the composite tubular member is represented by single lines as is shown in the legend. Each line represents a number of fiber thicknesses or a number of fiber plies. In FIG. 3, 16 designates the outer abrasive cover, and 18 the inner abrasion and chemically resistant liner for the composite tubular member. As shown in the drawing, the composite inner cores are made up of 0° oriented material and ±45° cross-plied material. The cross-plied fibers are usually contained in a uni-directional or woven fabric which as shown, may be extended from the core members to join them with the outer cylindrical member of the composite tubular member. For structural continuity and sealing, at least part of the ±45° web material is continued around the inner portion of the outer cylindrical member. The 0° oriented fibers may also be provided in cloth or fabric form, however, this material is usually present as rovings, i.e. bundles of fibers. As pointed out previously, the outer composite cylindrical member contains primarily ±55° cross-plied fibers with a small amount of ±90° oriented fibers. As previously pointed out, the fibers in the composite tubular member are held together or laminated with a suitable plastic binder which is not shown in the drawing.

Figure 4:
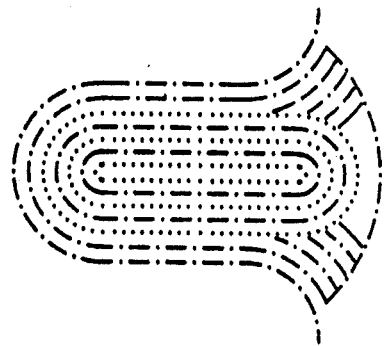
FIGS. 4, 5, and 6 are schematic cross-sectional views of the inner members of a composite tubular member showing alternative internal arrangements of the fibers.
Figure 5:
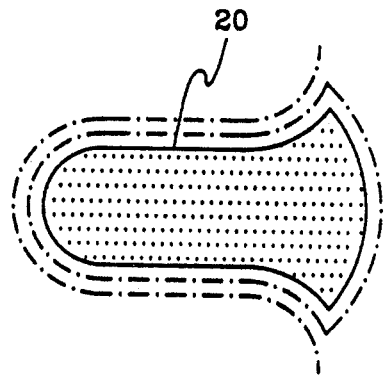
Figure 6:
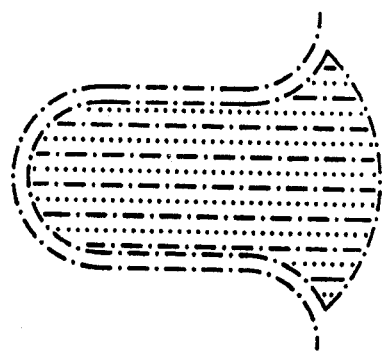

FIGS. 4, 5, and 6 show various internal arrangements of the fibers in the composite inner cores. In FIG. 4, the 0° and ±45° oriented fibers are both shown in a generally elliptical configuration. In FIG. 5, the 0° oriented fibers are concentrated in the inner portion of the core as designated by 20. In FIG. 6, both the 0° oriented fibers and the ±45° oriented fibers are arranged in a linear configuration which is parallel to the axis of the minor moment of inertia of the composite tubular member. In each of the arrangements shown in FIGS. 4, 5, and 6, both the sine wave portion and base portion of the core members are enclosed by ±45° oriented fibers which are continued entirely around the core members and onto the inner surface of the outer cylindrical composite member to resist shear stress and delamination.

The ±45° fibers which are utilized in the inner composite core members in part are of the preferred orientation, however, it is within the scope of the invention to use fibers oriented from ±40° to ±60° in the core members. In addition, while ±55° oriented fibers are preferred for use in the outer cylindrical composite member for same design requirements, fibers oriented from ±40° to ±70° may be used without departing from the scope of the invention. The fiber sequence or stacking sequence of the ±55°, 0°, 90° and ±45° fiber orientations shown in the drawings is only representative and may be varied to meet specific design requirements.

In addition to its use in well logging and well workovers, the composite tubular members of the invention may be used in subsea hydraulic lines or as production tubing in which long sections of tubing are spooled and run downhole for permanent production. Production tubing is normally larger in diameter than is required of coiled tubing and may become too large to bend onto a practical diameter spool. If tubing diameters become too large for spooling, it is entirely feasible to manufacture the composite tubular members on site, on shore or offshore. Larger spool sizes are practical for offshore where the composite tubular member can be manufactured near a dock site.

Another benefit may be noted for using composite coiled tubular members. With composite coiled tubing, deformations are elastic and this stored energy can be constructively used to help free the tubing from a stuck position or high friction bind. The pressure in the tubing can be pulsed to provide the foreseen function. Although this technique may have merit for steel coiled tubing as well as composite coiled tubing, the high stiffness of steel compared to the lower stiffness of the tubular members of this invention limits the magnitude of the local displacements associated with pressure pulsing steel tubing compared to displacements imposed using composite tubing. Activating a seal in the tubing down hole will permit pressure pulsing the composite tubing with a lower pressure imposed on the inside and the outside of the tubing. Pressure pulsing can also aid in freeing the coiled composite tubing stuck downhole.

In forming composite structures, several well known techniques may be use such as pultrusion, filament winding and molding. In pultrusion, filaments or fibers are drawn through a resin impregnating apparatus, then through dies to provide the desired shapes, or alternatively, the resin may be injected within the die. Heat forming and curing means are provided in conjunction with the dies. Finally, the desired product which is produced continuously may be wound onto a reel or spool. As an example, pultrusion is used in U.S. Pat. No. 4,416,329 to prepare a ribbon structure containing bundles of graphite fibers saturated with thermoplastic resin. The faces of the ribbon are covered with plies of woven material, such as glass fabric. Corner tows on the ribbon are made of Kevlar ® or glass. U.S. Pat. No. 4,452,314 uses pultrusion to form arcuate sections comprised of glass filaments or other reinforcing material disposed in a thermosetting resin. The arcuate sections are combined to form a sucker rod.

The composite tubular members of the invention may be manufactured using either conventional pultrusion or pull winding equipment or pultrusion in combination with braiding or filament winding. In one procedure the 0° oriented material is pultruded in advance and guided into a like shaped recess on a pultrusion mold and subsequently pultruded jointly with the cross-ply material. Pultrusion can be used to make either continuous or discrete length composite tubular members. In the pull winding process, the 0° oriented material is either fed into the process as a prefabricated rod or fed into the assembly as a pre-preg tape or wet layout. Cross-ply material is then wound onto the tube and the assembly is pulled through a die for integral curing. The pultrusion process may utilize material which is prepared by weaving or braiding the fibers. Woven or braided material can be prepared as feed stock or can be fabricated on-line as a part of the pultrusion operation.

When the composite tubular member is prepared by pultrusion, it may be desirable to add some 0° oriented fiber to the outer composite cylindrical member, up to about 10 percent, to aid in the manufacturing process.

While certain embodiments and details have been shown for the purpose of illustrating the present invention, it will be apparent to those skilled in the art that various changes and modifications may be made herein without departing from the spirit or scope of the invention.

I claim:

1. A composite tubular member having a longitudinal axis comprising an outer composite cylindrical outer member containing fibers cross-plied and oriented at ±40° to ±70° to the longitudinal axis of the tubular member and two smaller equally sized inner composite members of generally sine wave configuration positioned at their bases adjacent diametrically opposite inside walls of the outer composite cylindrical member, said inner members containing fibers oriented at 0° to the longitudinal axis of the tubular member and containing a lesser amount of fibers oriented at ±40° to ±60° to the axis of the tubular member.

2. The tubular member of claim 5 in which the outer composite cylindrical member contains from 1 to about 6 percent fibers oriented approximately 90° to the longitudinal axis of the tubular member.

3. The tubular member of claim 5 in which the inner solid composite members contain from about 5 to about 25 percent fibers oriented ±45° to the longitudinal axis of the tubular member.

4. The tubular member of claim 1 in which the inner surface of the tubular member is lined with an abrasion resistant impermeable material and the outer surface of the tubular member is covered with a material resistant to abrasion and having a low coefficient of friction.

5. The tubular member of one of claims 1 to 4 in which the 0° oriented inner members are made from graphite fibers and the outer composite cylindrical member is made from glass fibers.

6. The tubular member of claim 1 in which this outer composite cylindrical member contains fibers cross-plied and oriented at ±55° to the axis of the tubular member, said cylindrical member contains from about 5 to about 10 percent fibers oriented 90° to the axis of the tubular member and the inner composite members contain from about 25 percent fibers oriented to ±45° to the longitudinal axis of the tubular member.

7. The tubular member of claim 1 in which the amplitude of the sine wave configured inner members varies from 0.5 to 3.0 times the base of such members.

8. The tubular member of claim 1 in which the sine wave configured portions of the inner members are encapsulated with cross-plied fibers oriented to resist shear stress and delamination.

9. The tubular member of claim 8 in which the cross-plied fibers oriented to resist shear stress and delamination are extended around the inner surface of the outer composite cylindrical member.

10. A composite tubular member comprising an outer composite cylindrical member containing fibers oriented to resist internal pressure and provide low bending stiffness and two smaller equally sized inner composite members of generally sine wave configuration positioned at their bases adjacent diametrically opposite inside walls of the outer composite cylindrical member, said inner members containing fibers oriented to provide high axial stiffness, high tensile strength and positioned to provide low bending stiffness and fibers oriented to resist shear stress, wherein the amplitude of the sine wave configured inner members varies from 0.5 to 3.0 times the base of such members.

11. A composite tubular member comprising an outer composite cylindrical member containing fibers oriented to resist internal pressure and provide low bending stiffness and two smaller equally sized inner composite members of generally sine wave configuration positioned at their bases adjacent diametrically opposite inside walls of the outer composite cylindrical member, said inner members containing fibers oriented to provide high axial stiffness, high tensile strength and positioned to provide low bending stiffness and fibers oriented to resist shear stress, wherein the sine wave configured portions are encapsulated with cross-plied fibers oriented to resist shear stress and delamination.

12. The tubular member of claim 11 in which the cross-plied fibers oriented to resist shear stress and delamination are extended around the inner surface of the outer composite cylindrical member.

* * * * *

UNITED STATES PATENT AND TRADEMARK OFFICE
CERTIFICATE OF CORRECTION

PATENT NO. :   5,176,180
DATED      :   January 5, 1993
INVENTOR(S):   Jerry G. Williams and Mark W. Hopkins It is certified that error appears in the above-identified patent and that said Letters Patent is hereby corrected as shown below:

Column 6, line 67, "5" should be --1--.

Column 6, line 68, "1" should be --5--.

Column 7, line 1, "6" should be --10--.

Column 7, line 3, "5" should be --1--.

Signed and Sealed this

Twenty-eighth Day of December, 1993

Attest:

BRUCE LEHMAN

Attesting Officer            Commissioner of Patents and Trademarks